(12) United States Patent
Salant et al.

(10) Patent No.: US 10,228,060 B2
(45) Date of Patent: Mar. 12, 2019

(54) HYDRAULICALLY CONTROLLABLE MECHANICAL SEAL

(71) Applicant: Georgia Tech Research Corporation, Atlanta, GA (US)

(72) Inventors: Richard F. Salant, Dunwoody, GA (US); John Wilson Payne, Vidalia, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 681 days.

(21) Appl. No.: 14/774,279

(22) PCT Filed: Mar. 14, 2014

(86) PCT No.: PCT/US2014/028595
§ 371 (c)(1),
(2) Date: Sep. 10, 2015

(87) PCT Pub. No.: WO2014/152999
PCT Pub. Date: Sep. 25, 2014

(65) Prior Publication Data
US 2016/0018004 A1    Jan. 21, 2016

Related U.S. Application Data

(60) Provisional application No. 61/781,361, filed on Mar. 14, 2013.

(51) Int. Cl.
*F16J 15/34*   (2006.01)

(52) U.S. Cl.
CPC ....... *F16J 15/3448* (2013.01); *F16J 15/3432* (2013.01); *F16J 15/3496* (2013.01)

(58) Field of Classification Search
CPC .... F16J 15/34; F16J 15/44; F16J 15/16; F16J 15/18; F16J 15/46
See application file for complete search history.

(56) References Cited

U.S. PATENT DOCUMENTS 3,433,489 A   3/1969 Weise
3,948,530 A   4/1976 Gyory
(Continued)

FOREIGN PATENT DOCUMENTS

EP   1 918 618 A1   5/2008
JP   2957886 B2   10/1999
WO   WO 2009/143213 A2   11/2009

OTHER PUBLICATIONS

PCT/US2014/028595—International Search Report, dated Jul. 24, 2014.
(Continued)

*Primary Examiner* — Vishal A Patel
(74) *Attorney, Agent, or Firm* — Curatolo Sidoti Co., LPA; Joseph G. Curatola; Vincent A. Cortese (57) ABSTRACT

A controllable mechanical seal for sealing a shaft rotatable relative to a housing of a device which manipulates a fluid, the seal including: (i) a first face element having a first face surface, wherein the first face element is adapted to rotate with the shaft; (ii) a second face element having a second face surface, wherein the second face element is adapted to be supported within the housing; wherein the first face surface and the second face surface define a gap between the surfaces, physical dimensions of the gap contributing to defining a leakage rate of the fluid through the gap; wherein at least one of the first face element or the second face element includes at least one cavity wholly contained within the face element, the at least one cavity adapted to contain a hydraulic fluid; and wherein the at least one cavity is in fluid communication with at least one hydraulic intensifier and at least one pressure control valve, the at least one hydraulic intensifier being in pressure communication with a source of pressure; (iii) a sensor adapted to generate a signal indicative of the leakage rate; and (iv) a controller responsive to the signal for generating an output; wherein a
(Continued)

state of the at least one pressure control valve is adapted to change in response to the controller output in order to increase or decrease the pressure of the hydraulic fluid in the at least one cavity, thereby deforming one of the first face surface or the second face surface to adjust the leakage rate.

17 Claims, 3 Drawing Sheets

(56) References Cited

U.S. PATENT DOCUMENTS

| | | | | |
|---|---|---|---|---|
| 4,290,613 | A | * | 9/1981 | Scott ............... F16J 15/3432 |
| | | | | 277/399 |
| 4,575,100 | A | * | 3/1986 | Hay, II ............. F04C 15/0038 |
| | | | | 277/347 |
| 4,643,437 | A | * | 2/1987 | Salant ............... F16J 15/3432 |
| | | | | 277/319 |
| 4,691,276 | A | * | 9/1987 | Miller ............... G05B 13/02 |
| | | | | 700/47 |
| 4,838,559 | A | | 6/1989 | Guardiani et al. |
| 4,848,774 | A | | 7/1989 | Nyilas et al. |
| 5,064,205 | A | | 11/1991 | Whitford |
| 6,116,609 | A | | 9/2000 | Azibert |
| 6,371,488 | B1 | | 4/2002 | Szymborski et al. |
| 6,626,436 | B2 | | 9/2003 | Pecht et al. |
| 7,815,193 | B2 | | 10/2010 | Feistel et al. |
| 8,651,801 | B2 | | 2/2014 | Shamseldin et al. |
| 2003/0151209 | A1 | * | 8/2003 | Schmid ............... F16J 15/182 |
| | | | | 277/387 |
| 2009/0121440 | A1 | | 5/2009 | Feistel et al. |
| 2009/0290971 | A1 | | 11/2009 | Shamseldin et al. |
| 2010/0072706 | A1 | | 3/2010 | Schmitz et al. |
| 2014/0161587 | A1 | | 6/2014 | Shamseldin et al. |

OTHER PUBLICATIONS

PCT/US2014/028595—International Written Opinion, dated Jul. 24, 2014.
PCT/US2014/028595—Demand under Article 31, Dec. 10, 2014.
PCT/US2014/028595—International Preliminary Report on Patentability, dated Feb. 23, 2015.
Salant, R.F., et al., "Development of an Electronically Controlled Mechanical Seal", 11th International Conference on Fluid Sealing, BHRA, Apr. 8-10, 1987, Cannes, France.
Payne, John Wilson, "Feasibility Study Of A Controllable Mechanical Seal for Reactor Coolant Pumps", Thesis at Georgia Institute of Technology, May, 2013.
Zou, Min, et al., "Clearance Control of a Mechanical Face Seal", Tribology Transactions, 1999, vol. 42, Issue 3, pp. 535-540, Taylor & Francis, London, UK.
Salant, Richard, et al., "Electronically Controlled Mechanical Seal for Aerospace Applications—Part I: Design, Analysis, and Steady State Tests ©", Tribology Transactions, 1994, vol. 37, Issue 1, pp. 189-195, Taylor & Francis, London, UK.
Wolff, Paul J., et al., "Electronically Controlled Mechanical Seal for Aerospace Applications—Part II: Transient Tests ©", Tribology Transactions, 1995, vol. 38, Issue 1, pp. 51-56, Taylor & Francis, London, UK.

* cited by examiner

HYDRAULICALLY CONTROLLABLE MECHANICAL SEAL

CROSS REFERENCE TO RELATED APPLICATIONS

This application is a national stage application of International Application No. PCT/US2014/028595, filed 14 Mar. 2014, which claims priority from Untied States Provisional Patent Application No. 61/781,361, filed 14 Mar. 2013, which applications are incorporated herein by reference.

Provided is a controllable mechanical seal for sealing a rotatable shaft in the housing of a device which manipulates a fluid, such as a pump, against leakage of fluids along the shaft.

Mechanical seals may be formed with two face elements. One element may be attached to the housing of the machine to be sealed, and the other may be attached to and rotate with the shaft. One of the elements may be fixed so that no movement of the element occurs axially relative to the shaft. This element is referred to as the fixed face element. The other may be movable axially along the shaft, and is referred to as the floating face element. The face elements are located in opposed relationship to each other, and are arranged so that in response to opening force, closing force, or both, a sealing relationship will be obtained between them to control or prevent leakage along the shaft.

It has been found that a successful mechanical seal may be obtained, not when the elements are in direct physical contact with each other, but rather when a thin lubricating fluid film is provided between their opposing face surfaces during steady state operation. This fluid film prevents or reduces wear due to direct mechanical contact of the elements, thereby avoiding the possibility of mechanical damage or failure of the seal. However, the thickness of the fluid film must not be too large, as this will cause excessive leakage.

Further, it has been found that the thickness of the fluid film may be determined by the geometry of the face surfaces. In particular, if the two face surfaces are perfectly flat and parallel, such that a uniform gap is formed between them, the floating element may move into physical contact with the fixed element. In order to maintain a finite film thickness so as to prevent such a collapse, a sufficiently large opening force, which tends to move the floating element away from the fixed element, may be generated by fluid pressure within the gap. For this to happen, the opposing surfaces should not be parallel, but rather converge radially in the direction from the high pressure side to the low pressure side of the seal. If this convergence is increased, the opening force will increase and the film thickness will be increased. Similarly, if the convergence is decreased, the film thickness will be decreased.

Generally, mechanical seals are manufactured with the face elements designed such that their face surfaces have a predetermined convergence during steady state operation of the machine, taking into account the anticipated thermal and mechanical deformations of the elements. Thus a reasonable film thickness is realized. It should be understood that the thickness of the film is relatively small, on the order of approximately 1 to 5 μm. The deformations are equally small, on the order of approximately 0.5 to 2.5 μm. Heretofore, conventional mechanical seals have been designed and built very carefully based upon all the anticipated deformations so as to produce an acceptable film thickness at the condition of steady state operation. The film thickness was dependent upon the seal design characteristics, such as type of material, configuration, etc., and operating conditions such as temperature, pressure, speed, load and fluid characteristics. Thus the film thickness could not be controlled once the seal had been placed into service. Accordingly, conventional seals would experience face damage and wear when a wide range of operating conditions, including transient conditions, were encountered.

It is therefore desirable to provide a controllable mechanical seal in which the thickness of a thin fluid film separating two seal face elements may be controlled by external means. This allows the thickness of the film to be varied in response to changes in the operating conditions in order to maintain an optimum film thickness for a wide range of operating conditions.

Previous attempts have been made to provide a controllable mechanical seal utilizing piezoelectric materials in at least one of the seal faces. The piezoelectric materials expand and contract based on the voltage passing through the materials. While these materials may be able to provide suitable control characteristics to mechanical seals, the requirement for providing electricity to the material is not ideal, and in some cases undesirable. Piezoelectrically controllable mechanical seals are disclosed in U.S. Pat. No. 4,643,437, which is incorporated herein as if fully written out below.

What is needed is a controllable mechanical seal wherein the thickness of a lubricating film separating seal face elements is controlled by an externally developed force which is applied to at least one of the face elements to cause deformation of its face surface, wherein the externally developed force is not developed using piezoelectric materials. By controlling this deformation, the convergence of the opposing face surfaces is adjustable. The opening force is thus controllable such that an optimum film thickness may be obtained for a wide range of operating conditions.

Embodiments of the present subject matter are disclosed with reference to the accompanying drawings and are for illustrative purposes only. The subject matter is not limited in its application to the details of construction or the arrangement of the components illustrated in the drawings. Like reference numerals are used to indicate like components, unless otherwise indicated.

Provided is a controllable mechanical seal for sealing a shaft rotatable relative to a housing of a device which manipulates a fluid, the seal comprising: (i) a first face element having a first face surface, wherein the first face element is adapted to rotate with the shaft; (ii) a second face element having a second face surface, wherein the second face element is adapted to be supported within the housing; wherein at least one of the first face element or the second face element are movable axially along an axis of the shaft; wherein the first face surface and the second face surface define a gap between the surfaces, physical dimensions of the gap contributing to defining a leakage rate of the fluid through the gap; wherein at least one of the first face element or the second face element comprises at least one cavity wholly contained within the face element, the at least one cavity adapted to contain a hydraulic fluid; and wherein the at least one cavity is in fluid communication with at least one pressure control valve and optionally at least one hydraulic intensifier, the at least one cavity being in pressure communication with a source of pressure via the at least one pressure control valve or optionally via the at least one hydraulic intensifier; (iii) a sensor adapted to generate a signal indicative of the leakage rate; and (iv) a controller responsive to the signal for generating an output; wherein a state of the at least one pressure control valve is adapted to change in response to the controller output in order to increase or decrease the pressure of the hydraulic fluid in the at least one cavity, thereby deforming one of the first face surface or the second face surface to adjust the leakage rate.

Controllable mechanical seals as described in the previous paragraph are disclosed in "Feasibility Study of a Controllable Mechanical Seal for Reactor Coolant Pumps" by John Wilson Payne, published Apr. 3, 2013 by Georgia Institute of Technology, which is incorporated herein as if fully written out below.

As used herein, the term "in fluid communication" means fluid may be transported directly or indirectly between the two components which are in fluid communication.

As used herein, the term "in pressure communication" means that pressure may be transmitted directly or indirectly between the two components which are in pressure communication.

As used herein, the term "hydraulic intensifier" means a device which receives an input pressure from a source of pressure and modulates the input pressure to provide an output pressure which is greater than or less than the input pressure. Exemplary hydraulic intensifiers include devices which transform hydraulic power at low pressure into a reduced volume at higher pressure. A specific, non-limiting example of a hydraulic intensifier may be constructed by mechanically connecting two pistons, each working in a separate cylinder of a different diameter. As the pistons are mechanically linked, their force and stroke length are the same. If the diameters are different, the hydraulic pressure in each cylinder will vary inversely to the ratio of their areas, the smaller piston giving rise to a higher pressure.

The sensor may be any sensor which is capable of determining, directly or indirectly, the leakage rate. Non-limiting examples of suitable sensors are sensors capable of determining temperature, pressure, flow rate and/or gap thickness. For example, a sensor capable of determining temperature may indicate whether face contact is imminent, which would indicate that the leakage rate has decreased to an undesirable level, providing an indirect determination of the leakage rate.

The controller receives a signal from the sensor and determines what output is desired, if any, to change the state of the at least one pressure control valve in order to increase or decrease the pressure of the hydraulic fluid in the at least one cavity, thereby deforming one of the first face surface or the second face surface to adjust the leakage rate.

In certain embodiments, the controllable mechanical may include that the at least one cavity is in fluid communication with at least one pressure control valve and at least one hydraulic intensifier, the at least one cavity being in pressure communication with a source of pressure via the at least one hydraulic intensifier.

In certain embodiments, either or both of the first face element and the second face element may comprise a metal, a ceramic material, or a carbon-based material. In certain embodiments, at least one of the first face surface or the second face surface may comprise a ceramic material or a carbon-based material coated onto at least one of the first face element or the second face element. In certain embodiments, the metal may comprise steel. In certain embodiments, the ceramic material may comprise at least one of aluminum oxide, silicon carbide or tungsten carbide. In certain embodiments, the carbon-based material may comprise at least one of graphite, resin-bound carbon or metal-bound carbon. In certain embodiments, the steel may have an elastic modulus of about 200 GPa and a Poisson ratio of about 0.3 and/or the graphite may have an elastic modulus of about 27 GPa and a Poisson ratio of about 0.3. By "metal", what is meant is a metal or a metal alloy.

In certain embodiments, the controllable mechanical seal may comprise a plurality of cavities, each of the cavities being in fluid communication with a hydraulic intensifier via a pressure control valve for each of the cavities.

In certain embodiments, the controllable mechanical seal may comprise a plurality of cavities, each of the cavities being in fluid communication with a pressure control valve via a hydraulic intensifier for each of the cavities.

In certain embodiments, the hydraulic fluid in each of the cavities may provide a unique pressure in each of the cavities.

In certain embodiments, the controllable mechanical seal may comprise three cavities.

In certain embodiments, the device which manipulates a fluid may comprise a pump. The reactor coolant pump may be a centrifugal pump. In certain embodiments, the source of pressure is a high-pressure side of the pump.

In certain embodiments, the device which manipulates a fluid may comprise a reactor coolant pump associated with a reactor coolant system of a nuclear reactor. The reactor coolant pump may be a centrifugal pump. In certain embodiments, the source of pressure is at least one of the reactor coolant system, a high-pressure side of the reactor coolant pump, or pressure provided by another pump within the reactor coolant system.

Nuclear power plants rely on cooling systems to ensure safe, continuous operation of the nuclear reactor. Because of the large amount of heat generated by the fission reaction, the cooling systems demand a large volumetric flow of water to maintain a safe operating temperature. The cooling water may be supplied by one or more large centrifugal pumps. In order to maintain pump pressure and restrict water volume loss, the pumps typically utilize a multi-stage mechanical face seal system. These seals must operate with large pressure changes, potentially harsh water chemistry, and possible high temperature excursions during their service life. As such, the seals used in nuclear reactor coolant pumps (RCPs) must be very robust.

Mechanical seals may be chosen for RCP sealing needs because of their self-adjusting properties. These seals are designed to adjust automatically to varying fluid conditions to provide the required sealing behavior. Over the service life of an RCP seal, it must operate continuously within a specified range of leakage rates. The designed leakage rate serves to lubricate the gap between the seal faces, or the face gap, while minimizing overall fluid loss. This lubrication prevents the seal faces from coming into contact, which contact can cause accelerated wear and damage of the seal faces, jeopardizing sealing integrity. The lubrication also serves to cool the sealing components. The leakage rate of a mechanical seal is dependent on a variety of factors, including seal geometry and operating conditions. Two of the most important characteristics of a seal system are the face gap, or the average distance between the seal faces, and the coning, or the taper of the face gap from the inner diameter of the seal ring to the outer diameter. In addition, the face gap and the coning are dependent on one another.

Nuclear power stations can experience difficulties over the service life of a seal due to a number of factors. Due to continuous operation and long service lives, seal systems can experience gradual deviation from normal leakage rates. These deviations may be caused by an altered face gap. Over time, wear or chemical deposition may alter the face geometry of the seals, changing the behavior of the lubricating film and altering the face gap to produce too little or too much fluid leakage. If the leakage rate cannot be returned to an acceptable range, the nuclear reactor may be required to be shutdown, and replacement of the seal faces may be necessary, which is extremely costly to the plant operator. Therefore, it may be desirable to extend both the service life of seal systems and the ability of those systems to adjust to changing reactor coolant system conditions.

Figure 1:
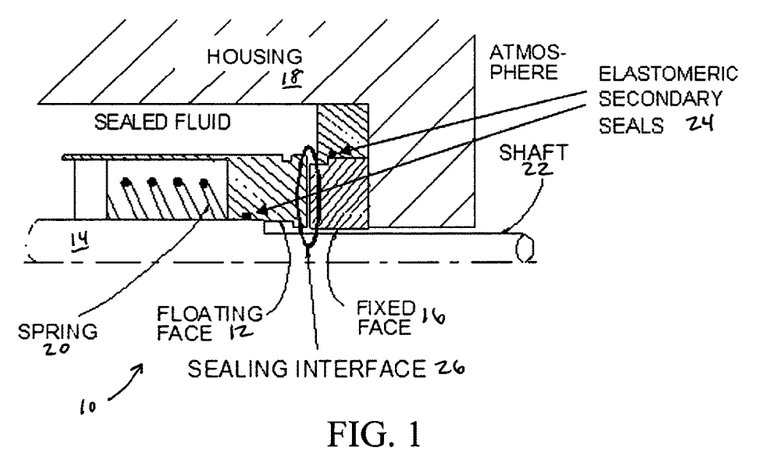
FIG. 1 is a schematic diagram of a portion of a centrifugal pump comprising a mechanical seal.

FIG. 1 illustrates an embodiment of a mechanical seal 10 used with a centrifugal pump. The mechanical seal 10 includes a first face element 12 which is fixed to and rotates with the shaft 14, and a second face element 16 which is fixed to the housing 18 and does not rotate. As shown in FIG. 1, the first face element 12 is flexibly mounted to the shaft 14, such as by a spring 20, such that the first face element 12 may travel along the shaft axis 22, and the second face element 16 is axially fixed. However, it is also possible for the first element 12 to be axially fixed and the second element 16 to be axially movable with the shaft 14. It is also possible that both the first element 12 and the second element 16 are axially fixed, and that the biasing force required to close the mechanical seal 10 while the centrifugal pump is not operating is provided by the weight of the seal itself. The first face element 12 and the second face element 16 restrict leakage by operating in close proximity to one another, such that any leakage through the mechanical seal 10 assembly must be through the sealing interface 26, also known as the face gap. Secondary seals 24 may help restrict fluid flow to the sealing interface 26. The spring 20 acts to close the face gap when the system is not rotating and provides a component of the closing force when the system is rotating. While the shaft 14 is rotating, the sealing interface 26 is lubricated by a small amount of fluid leakage through the sealing interface 26.

The sealing interface is a critical component of a mechanical seal. The seal face elements move relative to one another and are in close operation, so careful design and operation is necessary to maintain optimum sealing conditions in the sealing interface. In some seals, a full-film lubrication regime, in which the face elements do not contact each other, is desired, and in other seals, mixed lubrication, with partial face contact, is desired. For full-film lubrication, the sealing interface must be greater than three times the root mean square roughness of the seal faces; a smaller face gap will result in mixed lubrication. Full-film lubrication maximizes seal life by eliminating wear caused by face contact during normal operation, but results in a higher leakage rate. Mixed lubrication reduces the leakage rate, but wear and failures may occur more frequently due to sliding contact in the faces.

The axial position of one seal face element relative to the other seal face elements determines the average fluid film thickness. This film thickness influences all other behaviors in the face gap. These behaviors include, but are not limited to, heat generation rate, fluid pressure, contact area, wear rate, and leakage rate. The axial position of the seal face element which is movable along the axis of the shaft (the "floating face") is determined by the forces acting on it; an equilibrium position is reached when the sum of axial forces is zero. Forces that act to close the face gap are closing forces and forces that widen the face gap are opening forces.

Figure 2:
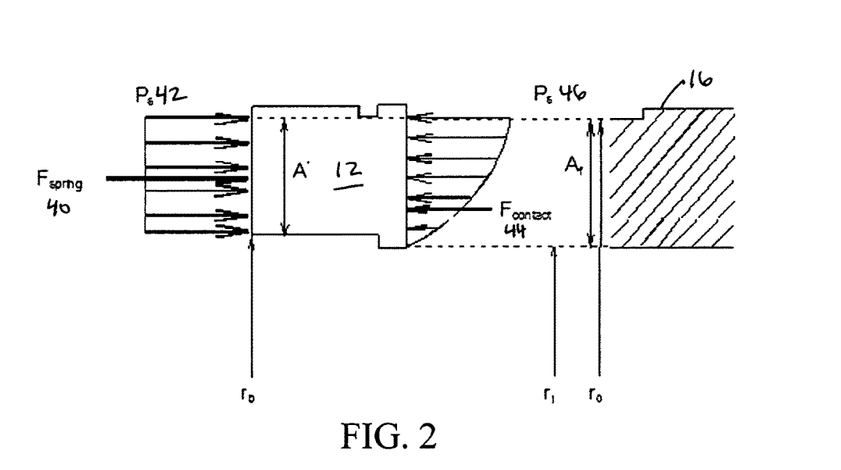
FIG. 2 is a schematic diagram of the forces acting on an exemplary mechanical seal.

Referring to FIG. 2, the closing forces include a biasing force 40, such as by a spring, and the pressure 42 exerted by the sealed fluid acting on the rear of the floating face 12. The force exerted by the pressure exerted by the sealed fluid may dominate this arrangement, in which case a biasing force 40 may not be required. For moderate to high pressures, the biasing force 40 may be negligible versus the pressure force 42. The opening forces include the contact force 44 and the pressure 46 exerted by the sealed fluid acting on the face of the floating face 12.

Figure 3:
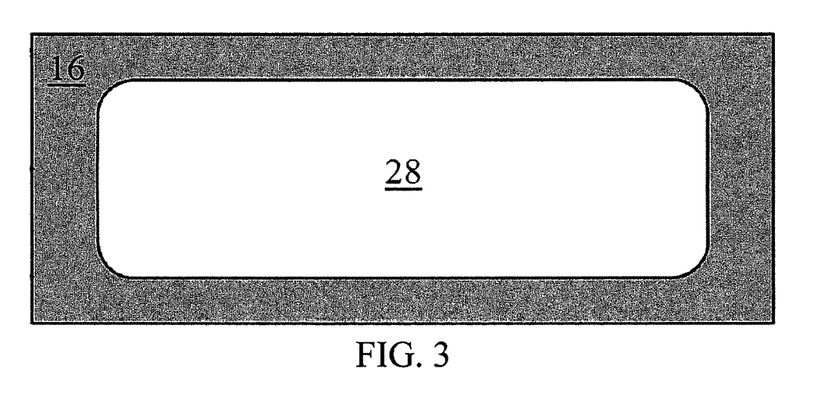
FIG. 3 is an embodiments of a hydraulically controllable mechanical seal face element.
Figure 4:
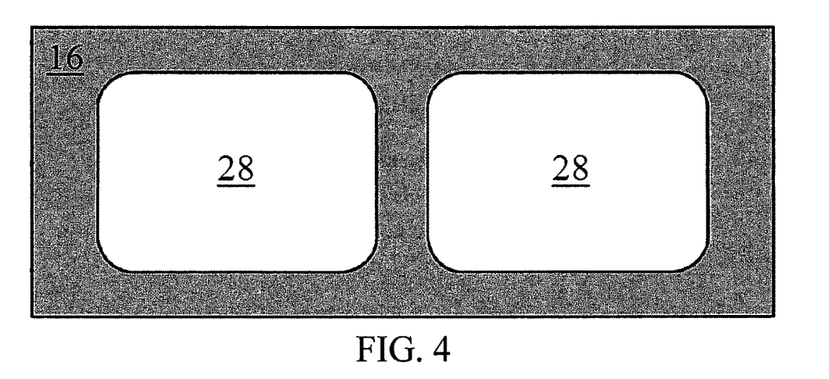
FIG. 4 is an embodiments of a hydraulically controllable mechanical seal face element.
Figure 5:
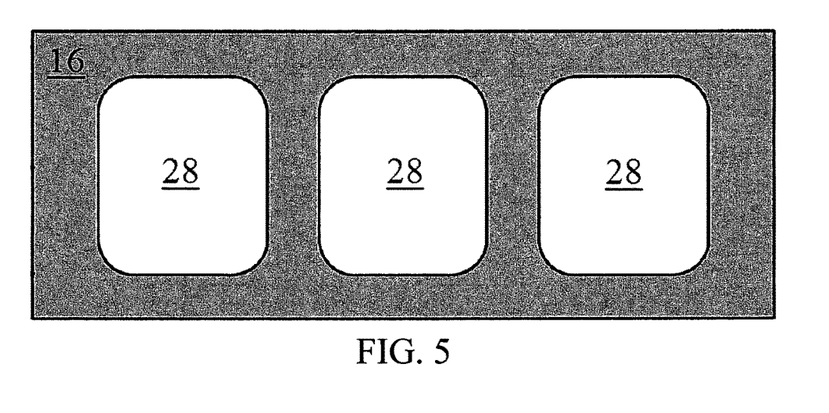
FIG. 5 is an embodiments of a hydraulically controllable mechanical seal face element.

As discussed above, at least one of the first face element or the second face element may comprise at least one cavity wholly contained within the face element. FIG. 3 illustrates a face element 16 having a single cavity 28. FIG. 4 illustrates a face element 16 having two cavities 28. FIG. 5 illustrates a face element having three cavities 28.

The face element(s) which include at least one cavity use hydraulic pressure either obtained from the discharge of the reactor coolant pump (RCP) (and thus limiting the maximum pressure to the full reactor coolant system pressure, if a hydraulic intensifier is not used) or from another existing pump in the reactor coolant system (RCS). Alternatively, an additional pumping system may be used to pressurize the hydraulic system for control. In certain embodiments, as shown in FIG. 5, three cavities are introduced into the seal face cross-section. These cavities may each be about 7 mm by about 8 mm in the dimensions depicted in FIG. 5, and may be evenly spaced within the seal face. The corners of the cavities may have a radius of about 0.5 mm to reduce stress concentrations in the corners. Within these cavities, which will be filled with hydraulic fluid during operation, a control pressure may be applied which will induce a downward deflection of the seal face to counteract the deflection caused by the sealed fluid pressure. This applied (or control) pressure attempts to adjust the coning of the seal face, which will alter the leakage rate. While FIGS. 3 through 5 depict the seals to be rectangular in cross-section, this need not be the case. In fact, it may be desirable to taper the face of the element 16 shown in FIGS. 3 through 5, as well as the opposing face, in order to provide pre-coning.

Figure 6:
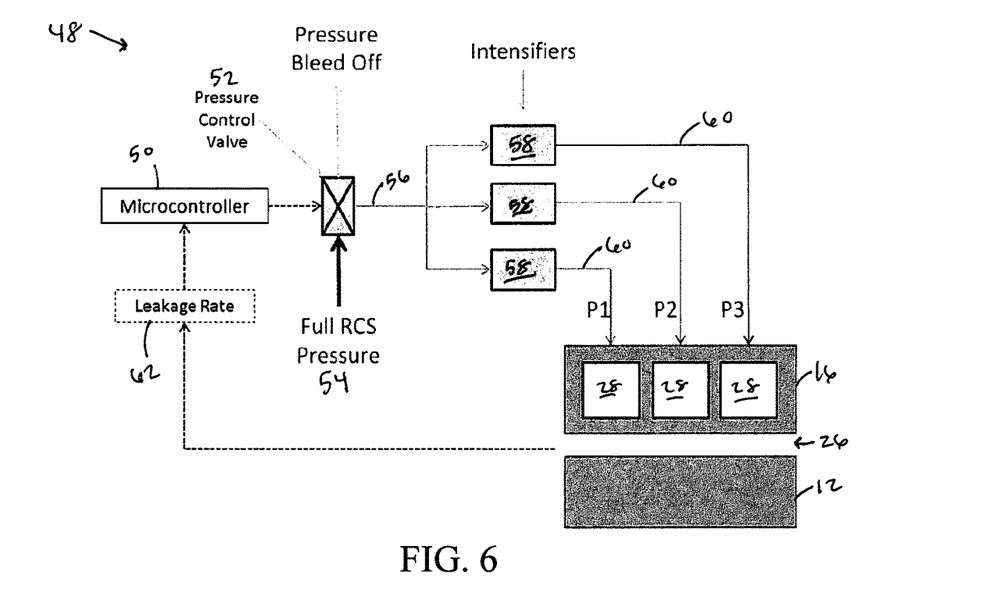
FIG. 6 is a schematic diagram of an illustrative hydraulic control system.

Non-limiting illustrative examples of two control systems used to moderate the hydraulic pressures in the face element depicted in FIG. 5 are described below. Referring to FIG. 6, the first example is a system 48 which uses a single point of electronic control to create three separate cavity pressures. A microcontroller 50 receives a signal from a sensor 62 indicating the leakage rate through the sealing interface 26. The microcontroller 50 is connected to a single pressure control valve 52 which moderates the source of pressure 54, such as the RCS pressure. Then, the controlled pressure 56 is fed into three independent hydraulic intensifiers 58. The RCS side of each intensifier would be exposed to RCS water at the controlled pressure 56, and the seal face side of each intensifier would act on a sealed line 60 of hydraulic fluid, such as oil, which would independently pressurize a single cavity 28. In certain embodiments, by selecting the pressure ratio of each hydraulic intensifier 58, three different pressures proportional to one another may be achieved within the individual cavities 28. In the illustrative control method of FIG. 6, the relationships between the three control pressures are fixed by the selected hardware.

Figure 7:
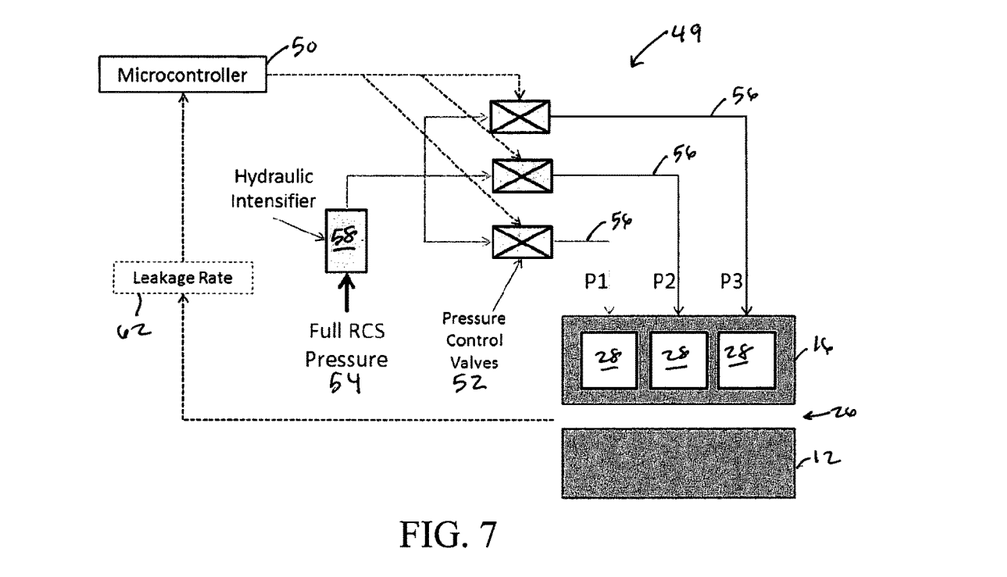
FIG. 7 is a schematic diagram of an illustrative hydraulic control system.

The second control system approach is shown in FIG. 7, which illustrates a system 49 which uses three independent electronically controlled valves to provide the cavity pressures. The system 49 of FIG. 7 is similar to that of FIG. 6, except that an optional single hydraulic intensifier 58 is exposed to the source of pressure 54 directly. The hydraulic intensifier 58 is not required in the system 49 to adequately control the cavity pressures, but the hydraulic intensifier may be desirable in certain situations, such as if it is desired to isolate the cavities 28 from the RCS water. The microcontroller 50 is connected to three independent pressure control valves 52 which moderate the pressure coming from the reactor coolant system, or optionally moderate the pressure of the hydraulic fluid, such as oil, from the hydraulic intensifier 58. The method of FIG. 7 is capable of employing software-based control of the cavity pressures and can provide for any desired relationship (or none at all) between each individual cavity pressure.

It is noted that, although the present controllable mechanical seal has been discussed with regard to use in centrifugal pumps used in nuclear reactor coolant systems, the controllable mechanical seal has uses in other industries and in apparatus other than pumps. The present controllable mechanical seal is suitable for use in any apparatus which requires a seal around a rotatable body.

The following examples are set forth merely to further illustrate the present subject matter. The illustrative examples should not be construed as limiting the subject matter in any manner.

The following examples describe computer simulations which simulate the use of hydraulically controllable or piezoelectrically controllable mechanical seals in centrifugal pumps for nuclear reactor coolant systems. In all examples, the nominal leakage rate through the mechanical seal is set to 11.36±0.11 L/min; this represents the leakage rate which is desired to be achieved by the controllable mechanical seal. The closing force on the axially-movable seal face element is varied in order to simulate variable operating conditions experienced by the mechanical seal, and to determine the capabilities of the mechanical seal to respond to varying operating conditions.

EXAMPLE 1

Example 1 is a hydraulically controllable mechanical seal including a face element made from 410 stainless steel, including three cavities as shown in FIG. 5. The pressure in the first cavity, near the outside of the radius of the mechanical seal, is $P_1$, the pressure in the second, or middle cavity is $P_2$, and the pressure in the third cavity, near the inside radius of the mechanical seal, is $P_3$. The value of $P_1$ is variable, the value of $P_2=P_1+2$ MPa, and the value of $P_3=P_1+4$ MPa. The nominal value of $P_1$, or the value to which the system will default when not attempting to correct the leakage rate, is 5 MPa. This allows the mechanical seal to increase or decrease cavity pressure in order to increase or decrease the deformation in the surface of the face element. Table 1 provides data which shows results achieved by the mechanical seal at various closing forces.

TABLE 1

| Closing Force (MN) | $P_1$ (MPa) | Corrected Leakage Rate (L/min) | Uncorrected Leakage Rate (L/min) |
|---|---|---|---|
| 0.490 | 12.11 | 11.39 | 14.24 |
| 0.492 | 9.46 | 11.43 | 13.22 |
| 0.494 | 7.20 | 11.28 | 12.05 |
| 0.495 | 6.00 | 11.24 | 11.69 |
| 0.496 | 4.51 | 11.32 | 11.21 |
| 0.498 | 2.26 | 11.26 | 10.25 |

Table 1 shows the value of $P_1$ which is required to obtain the corrected leakage rate at the specified closing force. The uncorrected leakage rate is the leakage rate at the specified closing force if $P_1$ defaulted to 5 MPa. Thus, the uncorrected leakage rate is the leakage rate which the mechanical seal is able to correct for at the specified closing force. This shows that the mechanical seal including a face element comprising 410 stainless steel is able to correct for leakage rates ranging from 10.25 to 14.24 L/min.

EXAMPLE 2

Example 2 is a hydraulically controllable mechanical seal similar to that of Example 1, except that the face element is made from carbon graphite available from SGL Group as EK-2200™ resin-bonded graphite. The pressure in the first cavity, near the outside of the radius of the mechanical seal, is $P_1$, the pressure in the second, or middle cavity is $P_2$, and the pressure in the third cavity, near the inside radius of the mechanical seal, is $P_3$. The value of $P_1$ is variable, the value of $P_2=P_1+2$ MPa, and the value of $P_3=P_1+4$ MPa. The nominal value of $P_1$, or the value to which the system will default when not attempting to correct the leakage rate, is 5 MPa. This allows the mechanical seal to increase or decrease cavity pressure in order to increase or decrease the deformation in the surface of the face element. Table 2 provides data which shows results achieved by the mechanical seal at various closing forces.

TABLE 2

| Closing Force (MN) | $P_1$ (MPa) | Corrected Leakage Rate (L/min) | Uncorrected Leakage Rate (L/min) |
|---|---|---|---|
| 0.460 | 11.67 | 11.36 | 25.61 |
| 0.465 | 10.02 | 11.46 | 22.25 |
| 0.475 | 8.31 | 11.26 | 18.08 |
| 0.480 | 7.45 | 11.35 | 15.77 |
| 0.488 | 6.01 | 11.46 | 13.11 |
| 0.490 | 5.60 | 11.41 | 12.47 |
| 0.492 | 5.40 | 11.27 | 11.98 |
| 0.494 | 5.23 | 11.37 | 11.59 |
| 0.495 | 5.00 | 11.38 | 11.38 |
| 0.500 | 4.13 | 11.27 | 10.28 |
| 0.515 | 0.97 | 11.28 | 7.44 |

Table 2 shows the value of $P_1$ which is required to obtain the corrected leakage rate at the specified closing force. The uncorrected leakage rate is the leakage rate at the specified closing force if $P_1$ defaulted to 5 MPa. Thus, the uncorrected leakage rate is the leakage rate which the mechanical seal is able to correct for at the specified closing force. This shows that the mechanical seal including a face element comprising carbon graphite is able to correct for leakage rates ranging from 7.44 to 25.61 L/min.

Without wishing to be limited by theory, it is believed that the carbon graphite seal is able to correct for a greater range of leakage rates because the carbon graphite is more elastic than the steel. It is noted that the range of control is not perfectly centered around the nominal leakage rate. The seal is able to correct for a wider range of high leakage rates than low leakage rates. This behavior is desirable because plant operators more commonly experience high leakage rates than low leakage rates. However, the performance of any of the proposed controllable seals can be tuned such that the range of leakage control available is biased higher or lower by adjusting the pre-coning and/or the closing force. This tuning can bias the range of control to address the most common instances of abnormal leakage rates, and could be used in other applications where abnormal high leakage rates are not the most common form of undesirable behavior.

EXAMPLE 3

Example 3 is a controllable mechanical seal including a face element made from piezoelectric material. The piezoelectric controllable seal uses an induced voltage across the face element to deform the surface of the face element. The structure of the simulations are similar to those described above with regard to Examples 1 and 2, except that the control parameter is voltage across the face element, rather than cavity pressure. The nominal voltage, or the voltage to which the system will default when not attempting to correct the leakage rate, is 0 V. This allows the mechanical seal to increase or decrease voltage in order to increase or decrease the deformation in the surface of the face element. Table 3 provides data which shows results achieved by the mechanical seal at various closing forces.

TABLE 3

| Closing Force (MN) | Voltage (V) | Corrected Leakage Rate (L/min) | Uncorrected Leakage Rate (L/min) |
| --- | --- | --- | --- |
| 0.490 | 4800 | 11.41 | 14.74 |
| 0.491 | 3800 | 11.38 | 13.88 |
| 0.492 | 2900 | 11.41 | 13.25 |
| 0.493 | 1850 | 11.46 | 12.84 |
| 0.494 | 900 | 11.38 | 12.09 |
| 0.495 | 0 | 11.43 | 11.43 |
| 0.496 | −675 | 11.36 | 11.03 |
| 0.497 | −1400 | 11.35 | 10.48 |
| 0.498 | −2300 | 11.41 | 10.09 |
| 0.499 | −3200 | 11.39 | 9.62 |
| 0.500 | −4040 | 11.27 | 9.18 |

Table 3 shows the voltage which is required to obtain the corrected leakage rate at the specified closing force. The uncorrected leakage rate is the leakage rate at the specified closing force if the voltage defaulted to 0 V. Thus, the uncorrected leakage rate is the leakage rate which the mechanical seal is able to correct for at the specified closing force. This shows that the mechanical seal including a face element comprising piezoelectric material is able to correct for leakage rates ranging from 9.18 to 14.74 L/min. This range is slightly larger than the range for the steel hydraulic seal, but significantly lower than the range for the carbon graphite hydraulic seal.

EXAMPLE 4

Example 4 is a controllable mechanical seal including a face element made from piezoelectric material, coated with a layer of graphite. The piezoelectric controllable seal uses an induced voltage across the face element to deform the surface of the face element. The structure of the simulations are similar to those described above with regard to Examples 1 and 2, except that the control parameter is voltage across the face element, rather than cavity pressure. The nominal voltage, or the voltage to which the system will default when not attempting to correct the leakage rate, is 0 V. This allows the mechanical seal to increase or decrease voltage in order to increase or decrease the deformation in the surface of the face element. Table 4 provides data which shows results achieved by the mechanical seal at various closing forces.

TABLE 4

| Closing Force (MN) | Voltage (V) | Corrected Leakage Rate (L/min) | Uncorrected Leakage Rate (L/min) |
| --- | --- | --- | --- |
| 0.490 | 4300 | 11.41 | 14.02 |
| 0.491 | 3300 | 11.38 | 13.51 |
| 0.492 | 2350 | 11.45 | 13.00 |
| 0.493 | 1625 | 11.38 | 12.37 |
| 0.494 | 800 | 11.36 | 12.02 |
| 0.495 | 0 | 11.36 | 11.36 |
| 0.496 | −800 | 11.37 | 11.10 |
| 0.497 | −1500 | 11.32 | 10.55 |
| 0.498 | −2350 | 11.31 | 10.11 |
| 0.499 | −3125 | 11.27 | 9.59 |
| 0.500 | −4020 | 11.46 | 9.10 |

Table 4 shows the voltage which is required to obtain the corrected leakage rate at the specified closing force. The uncorrected leakage rate is the leakage rate at the specified closing force if the voltage defaulted to 0 V. Thus, the uncorrected leakage rate is the leakage rate which the mechanical seal is able to correct for at the specified closing force. This shows that the mechanical seal including a face element comprising piezoelectric material with a graphite coating is able to correct for leakage rates ranging from 9.10 to 14.02 L/min. These results are very similar to those provided by Example 3.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

What is claimed is:

1. A controllable mechanical seal for sealing a shaft rotatable relative to a housing of a device which manipulates a fluid, the seal comprising:
   i. a first face element having a first face surface, wherein the first face element is adapted to rotate with the shaft;
   ii. a second face element having a second face surface, wherein the second face element is adapted to be supported within the housing;
   wherein at least one of the first face element or the second face element are movable axially along an axis of the shaft;
   wherein the first face surface and the second face surface define a gap between the surfaces, physical dimensions of the gap contributing to defining a leakage rate of the fluid through the gap;
   wherein at least one of the first face element or the second face element comprises a plurality of cavities wholly contained within the face element, each of the plurality of cavities adapted to contain a hydraulic fluid; and
   wherein each of the plurality of cavities is independently in fluid communication with at least one pressure control valve and at least one hydraulic intensifier, each of the plurality of cavities independently being in pressure communication with a source of pressure via the at least one pressure control valve and via the at least one hydraulic intensifier;

iii. a sensor adapted to generate a signal indicative of the leakage rate; and iv. a controller responsive to the signal for generating an output;

wherein a state of the at least one pressure control valve is adapted to change in response to the controller output in order to increase or decrease the pressure of the hydraulic fluid in each of the plurality of cavities, independently, thereby deforming one of the first face surface or the second face surface to adjust the leakage rate.

2. The controllable mechanical seal of claim 1, wherein at least one of the first face element and the second face element comprise a metal, a ceramic material, or a carbon-based material.

3. The controllable mechanical seal of claim 1, wherein at least one of the first face surface or the second face surface comprises a ceramic material or a carbon-based material coated onto at least one of the first face element or the second face element.

4. The controllable mechanical seal of claim 2, wherein:
(i) the metal material comprises steel;
(ii) the ceramic material comprises at least one of aluminum oxide, silicon carbide or tungsten carbide; and/or
(iii) the carbon-based material is at least one of graphite, resin-bound carbon or metal-bound carbon.

5. The controllable mechanical seal of claim 4, wherein the steel has an elastic modulus of about 200 GPa and a Poisson ratio of about 0.3 and/or the graphite has an elastic modulus of about 27 GPa and a Poisson ratio of about 0.3.

6. The controllable mechanical seal of claim 1, wherein each of the plurality of cavities is independently in fluid communication with the at least one hydraulic intensifier via the at least one pressure control valve for each of the plurality of cavities.

7. The controllable mechanical seal of claim 1, wherein each of the plurality of cavities is independently in fluid communication with the at least one pressure control valve via the at least one hydraulic intensifier for each of the plurality of cavities.

8. The controllable mechanical seal of claim 6, wherein the hydraulic fluid in each of the plurality of cavities provides a unique pressure in each of the plurality of cavities.

9. The controllable mechanical seal of claim 1, wherein the plurality of cavities comprises three cavities.

10. The controllable mechanical seal of claim 2, wherein at least one of the first face surface or the second face surface comprises a ceramic material or a carbon-based material coated onto at least one of the first face element or the second face element.

11. The controllable mechanical seal of claim 3, wherein:
(i) the metal material comprises steel;
(ii) the ceramic material comprises at least one of aluminum oxide, silicon carbide or tungsten carbide; and/or
(iii) the carbon-based material is at least one of graphite, resin-bound carbon or metal-bound carbon.

12. The controllable mechanical seal of claim 7, wherein the hydraulic fluid in each of the plurality of cavities provides a unique pressure in each of the plurality of cavities.

13. A device which manipulates a fluid, comprising a controllable mechanical for sealing a shaft rotatable relative to a housing of the device, the seal comprising:

i. a first face element having a first face surface, wherein the first face element is adapted to rotate with the shaft;

ii. a second face element having a second face surface, wherein the second face element is adapted to be supported within the housing;

wherein at least one of the first face element or the second face element are movable axially along an axis of the shaft;

wherein the first face surface and the second face surface define a gap between the surfaces, physical dimensions of the gap contributing to defining a leakage rate of the fluid through the gap;

wherein at least one of the first face element or the second face element comprises a plurality of cavities wholly contained within the face element, each of the plurality of cavities adapted to contain a hydraulic fluid; and wherein each of the plurality of cavities is independently in fluid communication with at least one pressure control valve and at least one hydraulic intensifier, each of the plurality of cavities independently being in pressure communication with a source of pressure via the at least one pressure control valve and via the at least one hydraulic intensifier;

iii. a sensor adapted to generate a signal indicative of the leakage rate; and iv. a controller responsive to the signal for generating an output;

wherein: a state of the at least one pressure control valve is adapted to change in response to the controller output in order to increase or decrease the pressure of the hydraulic fluid in each of the plurality of cavities, independently, thereby deforming one of the first face surface or the second face surface to adjust the leakage rate.

14. The device of claim 13, wherein the device comprises a pump, optionally a centrifugal pump.

15. The device of claim 14, wherein the source of pressure is a high-pressure side of the pump.

16. The device of claim 13, wherein the device comprises a reactor coolant pump associated with a reactor coolant system of a nuclear reactor, wherein the reactor coolant pump optionally is a centrifugal pump.

17. The device of claim 16, wherein the source of pressure is at least one of the reactor coolant system, a high-pressure side of the reactor coolant pump, or pressure provided by another pump within the reactor coolant system.

* * * * *